(12) United States Patent
Mitchell et al.

(10) Patent No.: US 10,632,394 B2
(45) Date of Patent: Apr. 28, 2020

(54) TIMEPIECE ILLUSION DEVICE

(71) Applicant: NOBODY KNOWS LLC, Los Angeles, CA (US)

(72) Inventors: Christopher Mitchell, Sherman Oaks, CA (US); Rory Adams, London (GB)

(73) Assignee: NOBODY KNOWS LLC, Los Angeles, CA (US)

( * ) Notice: Subject to any disclaimer, the term of this patent is extended or adjusted under 35 U.S.C. 154(b) by 0 days.

(21) Appl. No.: 16/452,140

(22) Filed: Jun. 25, 2019

(65) Prior Publication Data

US 2020/0001195 A1  Jan. 2, 2020

Related U.S. Application Data

(60) Provisional application No. 62/690,793, filed on Jun. 27, 2018.

(51) Int. Cl.
| | |
|---|---|
| *A63J 21/00* | (2006.01) |
| *G04G 21/04* | (2013.01) |
| *H04W 4/80* | (2018.01) |
| *G06F 3/0488* | (2013.01) |

(52) U.S. Cl.
CPC .............. *A63J 21/00* (2013.01); *G04G 21/04* (2013.01); *G06F 3/04883* (2013.01); *H04W 4/80* (2018.02)

(58) Field of Classification Search
CPC ................................. A63J 21/00; G04G 21/06
USPC ...................................................... 472/57, 72
See application file for complete search history.

(56) References Cited

U.S. PATENT DOCUMENTS

| | | | | |
|---|---|---|---|---|
| 4,139,837 | A * | 2/1979 | Liljenwall | G04G 9/007 368/10 |
| 4,245,323 | A * | 1/1981 | Yamazaki | G04B 19/22 368/10 |
| 5,559,761 | A * | 9/1996 | Frenkel | G04G 21/06 368/187 |
| 7,506,035 | B1 * | 3/2009 | Lu | G04G 15/006 368/10 |
| 2015/0022466 | A1 * | 1/2015 | Levesque | G06F 3/017 345/173 |
| 2015/0106770 | A1 * | 4/2015 | Shah | H04M 1/64 715/863 |
| 2017/0060098 | A1 * | 3/2017 | Yonekura | G04R 20/30 |
| 2018/0101137 | A1 * | 4/2018 | Cheung | G04R 20/26 |
| 2018/0239527 | A1 * | 8/2018 | Kwon | G06F 3/16 |

* cited by examiner

*Primary Examiner* — Edwin A. Leon
*Assistant Examiner* — Jason M Collins
(74) *Attorney, Agent, or Firm* — Risso I.P.

(57) ABSTRACT

A timepiece illusion device is formed to appear as an ordinary analog watch or timepiece with hour and minute hands. A software application (Illusion App) is provided that can be loaded onto a smartphone or other device. The Illusion App allows a user to provide inputs into the smartphone, which are transmitted (e.g., as time commands, etc.) from the smartphone to the timepiece illusion device. The timepiece illusion device then moves the hour and minute hands per the time command or otherwise performs the relevant operation per the input from the smartphone.

15 Claims, 20 Drawing Sheets

TIMEPIECE ILLUSION DEVICE

CROSS-REFERENCE TO RELATED APPLICATIONS

The present application is a non-provisional application of U.S. Provisional Application No. 62/690,793 filed on Jun. 27, 2018, the entirety of which is incorporated herein by reference.

BACKGROUND OF THE INVENTION (1) Field of Invention

The present invention relates to an illusion device and, more particularly, to an illusion device formed to appear as an ordinary analog to allow a magician to perform a variety of illusions.

(2) Description of Related Art

Analog watches or timepieces traditionally consist of an hour hand and minute hands that rotate around the face of the timepiece. The mechanism inside such an analog device is traditionally formed of wound gears or, in some more recent innovations, through a battery powered mechanism. Separately, digital watches have been conceived that include a digital face and provide a variety of digital functions. Users of such digital watches simply access the controls using a front digital panel.

In other art, magicians sometimes employ a variety of techniques to provide illusions to their subjects. For example, a magician may use a deck of cards with secret markings to allow the magician to identify which number and suite of the cards are presented through the markings on the back of the cards, thereby providing the illusion that the magician somehow knew what the card was. While a number of illusion devices have been created over the years, magicians have traditionally had trouble providing the illusion of guessing particular selected times.

Thus, a continuing need exists for an illusion device formed to appear as an ordinary analog timepiece to allow a magician to perform a variety of illusions.

SUMMARY OF INVENTION

This disclosure is directed timepiece illusion device formed to appear as an ordinary analog watch or timepiece with hour and minute hands. Specifically, described is a timepiece illusion system that includes a timepiece illusion device, a controlling device and executable instructions for causing the controlling device to perform the specified operations.

In some aspects, the timepiece illusion device includes a watch face with hour and minute hands. The hour and minute hands are separately rotatable about the watch face. Further, a microprocessor is configured to receive a wireless time command from an external controlling device and cause the hour and minute hands to rotate about the watch face to reflect the wireless time command.

In another aspect, the wireless time command is received using a technology selected from a group consisting of Bluetooth, radio frequency, and radio frequency identification (RFID).

In yet another aspect, the timepiece illusion device further comprises a vibrator mechanism, such that when the hour and minute hands are set to reflect the wireless time command, the microprocessor causes the vibrator mechanism to vibrate, thereby indicating that the hour and minute hands have been set to reflect the wireless time command.

As noted above, this disclosure also provides a controlling device. The controlling device (e.g., smart phone, etc.) includes executable instructions stored on a non-transitory computer readable medium, such that upon execution of the instructions, the controlling device is caused to perform several operations, such as receiving a time command and wirelessly transmitting the time command to the timepiece illusion device.

In yet another aspect, in receiving the time command, the controlling device is configured to be set in at least one of a variety of modes, including a swipe mode, a voice recognition mode, a false passcode screen mode, and a false calculator screen mode.

In the swipe mode, the controlling device receives swipe commands on a touch screen, the swipe commands being directional swipes on the touch screen to indicate an hour and minute command.

In the voice recognition mode, the controlling device uses voice recognition to receive a stated time by a performer.

In the false passcode screen mode, the controlling device depicts a false passcode screen, such that inputs into the false passcode screen are converted into the time command.

In the false calculator screen mode, the controlling device depicts a false calculator screen, such that inputs into the false calculator screen are converted into the time command.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. In some aspects, the one or more processors are embedded within the controlling device, such as within a smart phone, thereby causing the smart phone to perform the operations as described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to an illusion device and, more particularly, to a timepiece illusion device formed to appear as an ordinary analog timepiece to allow a magician to perform a variety of illusions. The invention is also directed to a corresponding software application or illusion app that can connect with and operate the timepiece illusion device. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
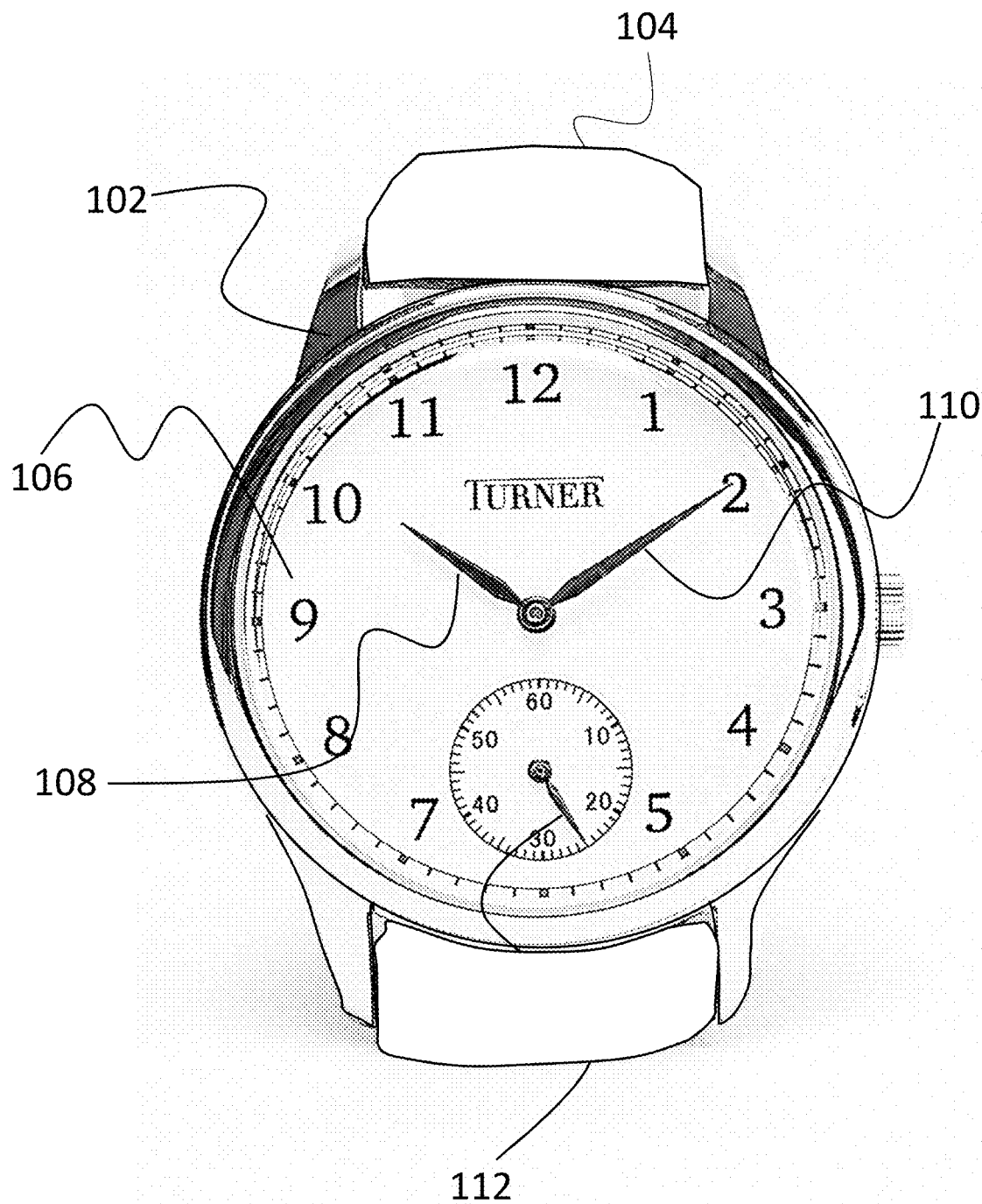
FIG. 1 is an image of a timepiece illusion device, with a watch face appearing as an ordinary analog timepiece according to various embodiments of the present invention.

This disclosure is directed to a timepiece illusion system that includes both a timepiece illusion device 102 and corresponding software application (i.e., the "Illusion App"). The timepiece illusion device 102 is formed to appear as an ordinary analog timepiece or watch to allow a magician to perform a variety of illusions. Although not limited thereto, desirably, the watch is made of high-end materials (e.g., leather strap 104, gold or gold appearing hands 108, 110, and 112, etc.), and is designed in a way for it to look like a very regular-vintage inspired Swiss watch (see FIG. 1) with hour 108 and minute hands 110 on its watch face 106. In other words, the watch is formed to appear as a traditional analog watch, which is a watch whose display is not digital but rather analog with a traditional clock face.

Figure 2A:
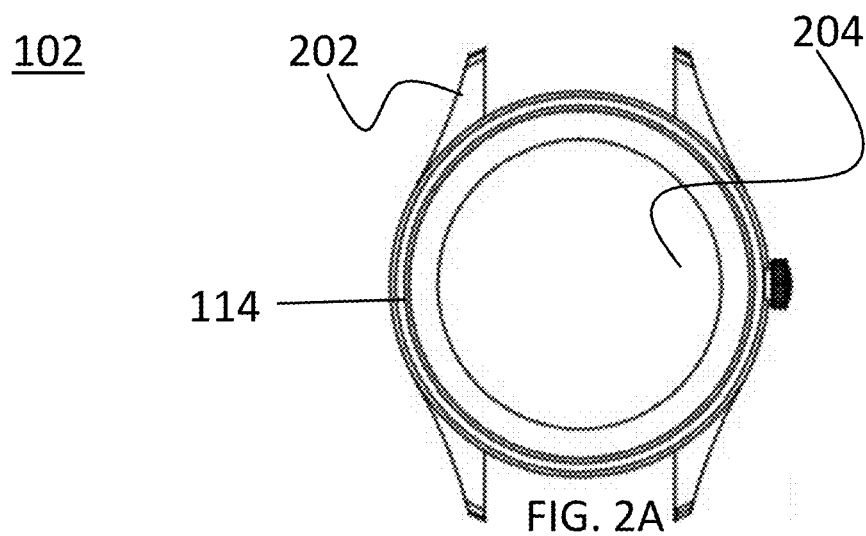
FIG. 2A is a bottom-view illustration of the timepiece illusion device, depicting the bottom plate, band attachments, and watch crown according to various embodiments of the present invention.
Figure 2B:
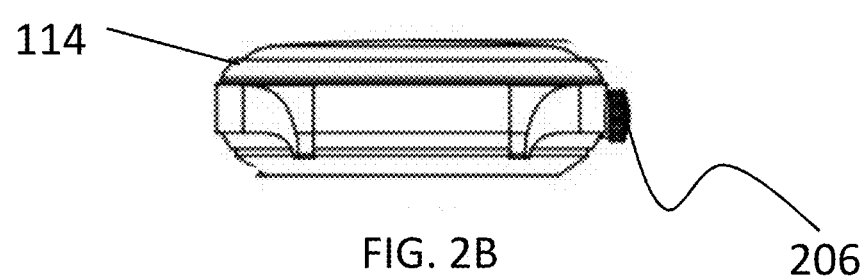
FIG. 2B is a side-view illustration of the timepiece illusion device according to various embodiments of the present invention.
Figure 2C:
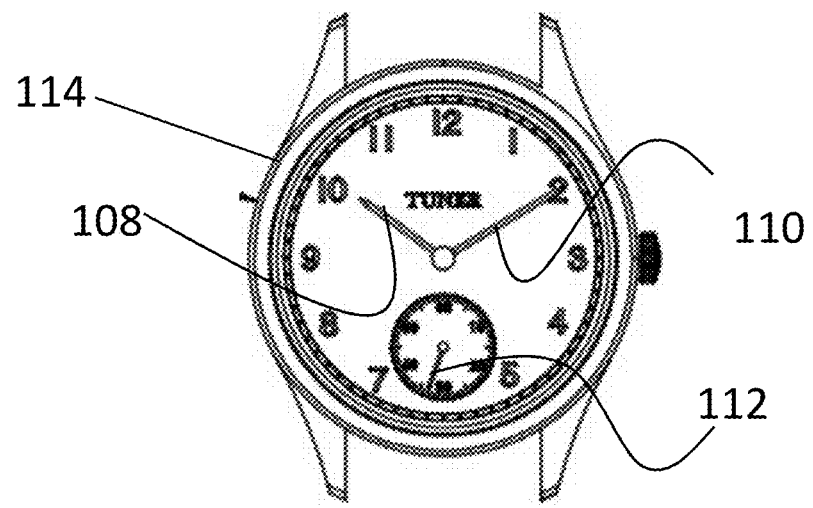
FIG. 2C is a top-view illustration of the timepiece illusion device according to various embodiments of the present invention.

The timepiece illusion device 102 and its housing 114 is further illustrated in FIGS. 2A through 2C. FIG. 2A depicts a bottom-view, showing the bottom plate 204 that can be removed to access the electronic components and the battery therein. The illustration also shows the watch band attachment 202 where a band (e.g., leather band) can be attached. The side view drawing in FIG. 2B shows the watch crown 206, which can be used to manually adjust the hands of the analog-looking watch. The crown is also able to be set using the App. For example, in one aspect, when the crown is pressed it adjusts to the predetermined time set in the App. This allows a spectator to adjust the watch to their desired time, but when the crown is pushed in, as one would normally do to set the adjusted time, the hands will relocate to the predetermined time from the App. In other words, the watch crown 206 is operably connected with the hands (via gears, shafts, etc.) to allow rotation of the watch crown 206 to turn the various hands on the illusion device 102. FIG. 2C provides a top-view illustration, depicting the watch face and movable hands 108, 110, and 112.

Figure 3:
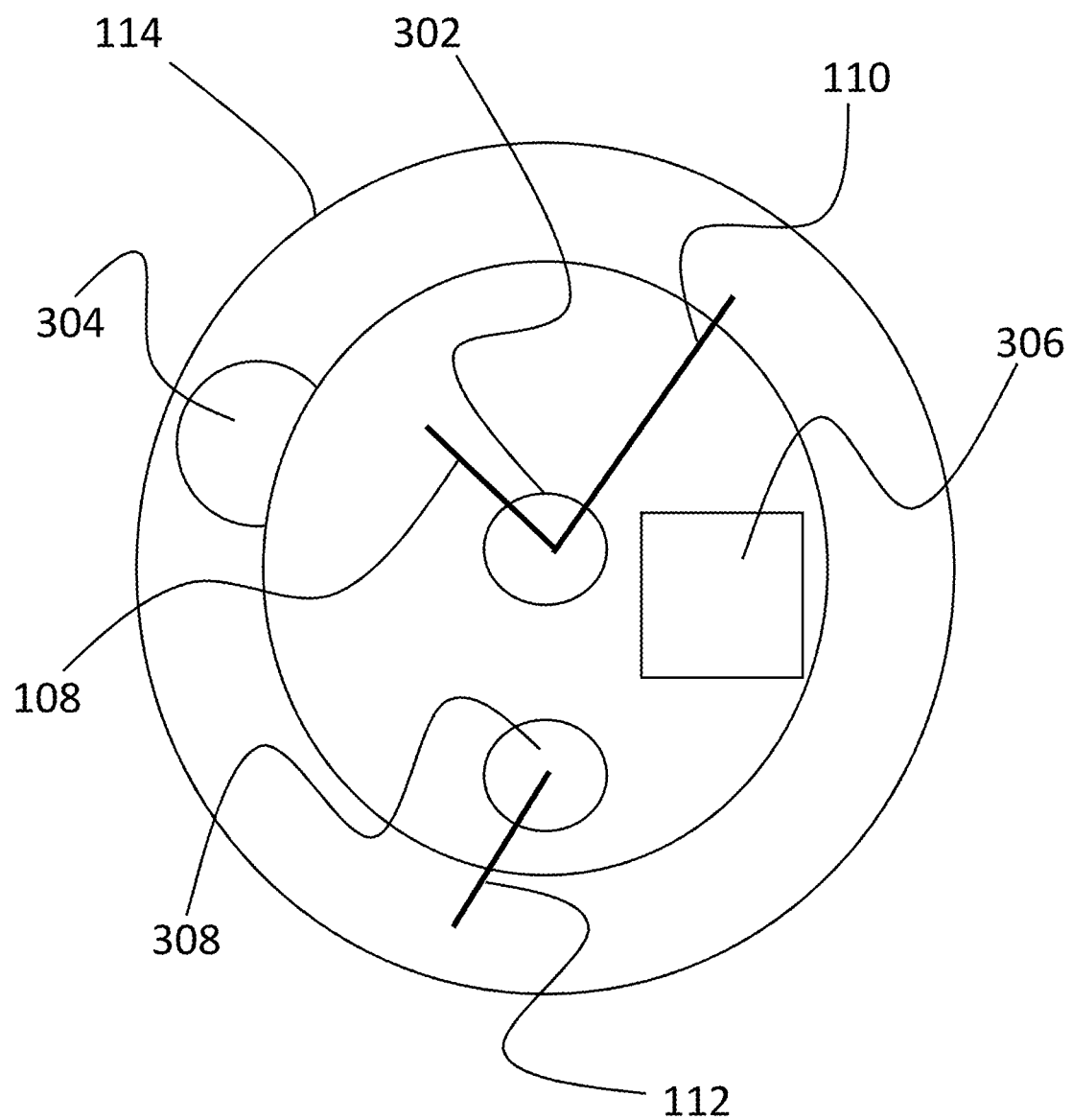
FIG. 3 is an illustration depicting example interior components of the timepiece illusion device, showing a watch face, battery, motor, and microprocessor according to various embodiments of the present invention.

As shown in FIG. 3, the secret in the illusion device is that the housing 114 includes a battery powered mechanism that allows the watch to connect wirelessly to and be controlled by a separate controlling device (e.g., smart phone, smart watch, remote control, tablet computer, etc.) that employs the Illusion App or otherwise includes a technique for receiving a command and transmitting the command to the watch. As clearly understood by those skilled in the art, such a battery powered mechanism comprises any hardware/ software etc. as may be necessary to allow the watch to receive commands from the external controlling device and turn the hands on the watch, including but without limitation to a processing component (such as a microprocessor 306, motors 302 and 308, and any receiver and/or transmitter as needed).

The powered micro motor 302 and 308 controls the arms for the hour hand 108, minute hand 110, and second hand 112, which correspond with the inputs that can be entered or otherwise controlled by the separate controlling device. These items would be powered by any suitable power source, such as a replaceable or rechargeable battery 306. The timepiece illusion system is controlled by a microprocessor 306, which includes or otherwise is connected with a transmitter and/or receiver that allows communication between the timepiece illusion device and the controlling device that employs the Illusion App or other input control (e.g., a remote control with buttons). In other words, the timepiece illusion device 102 includes any hardware/software etc. as may be necessary to allow the microprocessor 306 to receive commands from the external controlling device. As a non-limiting example, the illusion device 102 includes Bluetooth components to allow the illusion device 102 to link with and be controlled by the external controlling device. The microprocessor 306 also controls the hands 108, 110, and 112 by sending the signal of the action and time to the powered mechanisms 302 and 308, which would move the time hands 108, 110, and 112.

Figure 4:
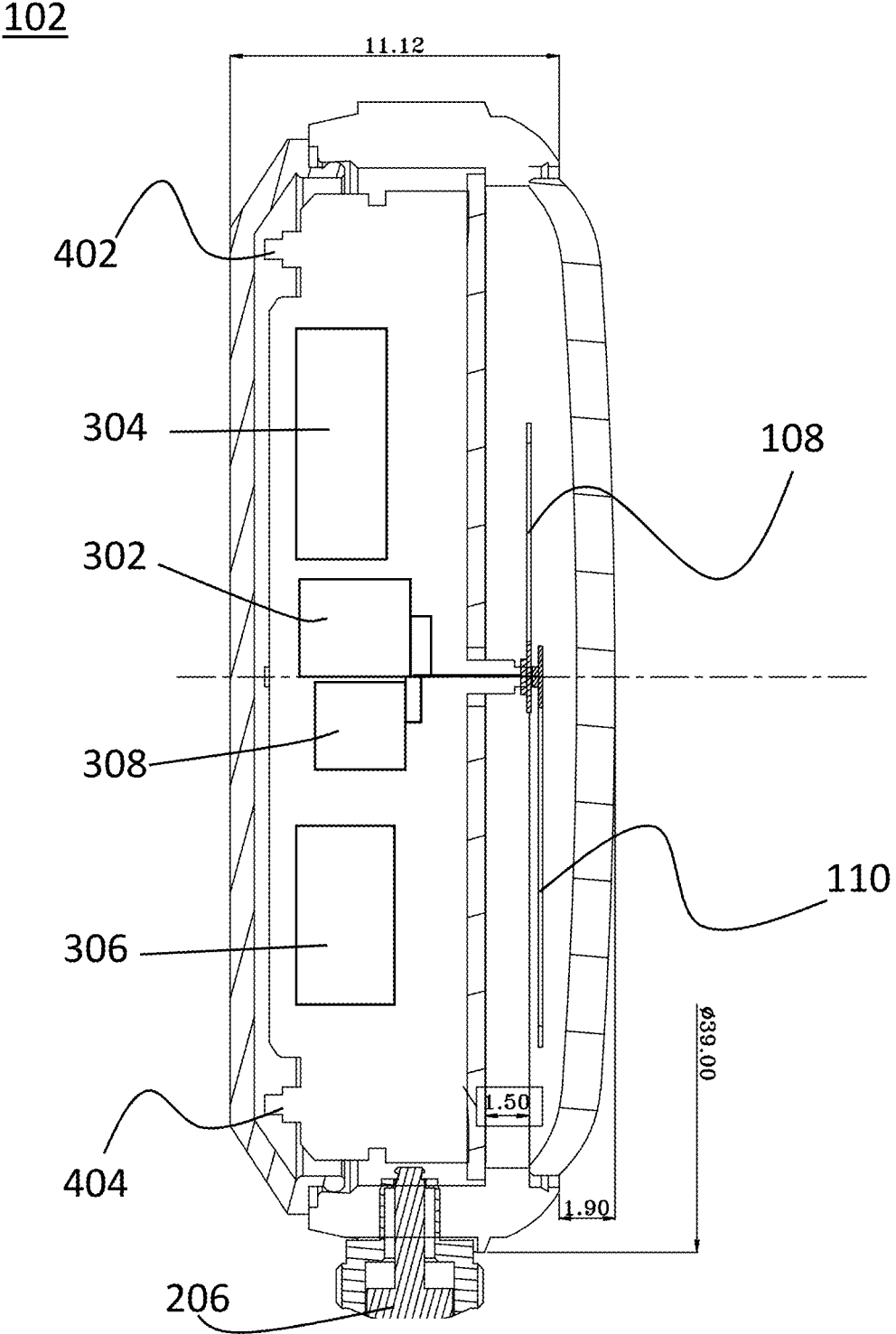
FIG. 4 is a cross-sectional, side-view illustration of the timepiece illusion device, depicting the housing for the electrical components and mechanical elements according to various embodiments of the present invention.

A cross-sectional side view illustration can be seen in FIG. 4, showing the assembly of the timepiece illusion device 102. Shown are the microprocessor 306, battery 304, and powered mechanisms 302 and 308. FIG. 4 also demonstrates the interior clasps 402 and 404, which is a locking mechanism to hold the back plate in place, also making the back plate removable for battery 304 replacement, charging, or other watch component maintenance. In one non-limiting example, the back plate is removable by using a watch tool or razor blade to gently disengage the internal clasps which allows the plate to come off.

Figure 5:
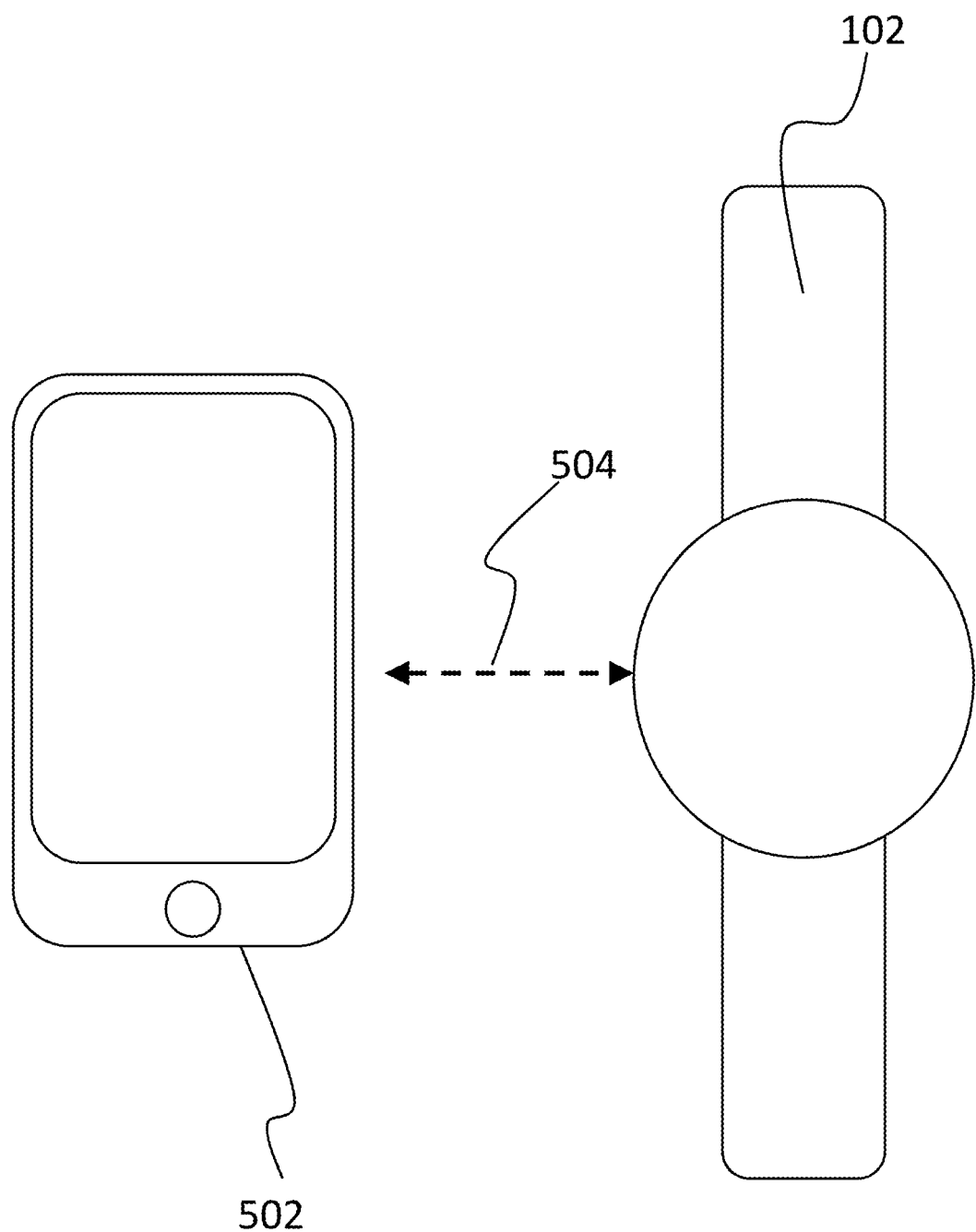
FIG. 5 is an illustration of the timepiece illusion device, depicting example connectivity between the timepiece illusion device and a smart phone according to various embodiments of the present invention.

As noted above, the magic in the invention is that the timepiece illusion device 102 appears as a traditional analog watch; however, it is digital and can be controlled by an external controlling device to provide a variety of illusions to spectators or an audience. As a non-limiting example and shown in FIG. 5, the illusion device 102 can connect wirelessly 504 (via Bluetooth, etc.) to a controlling device 502 embodied as a smart phone (i.e., the magician's or assistant's smart phone) that uses a corresponding timepiece illusion device software application or Illusion App. To sync the watch, which has an individualized serial number, with the electronic device, a smart device would download the App, recognize the watch in the immediate proximity and begin the syncing process while the crown was pressed for a predetermined period of time (e.g., three seconds, etc.). In other words, this disclosure also includes an Illusion App that can be loaded onto a variety of controlling devices (e.g., smart phones, tablet computers, remote control, etc.). The controlling device can also be configured to provide a vibration feedback when sending the time and when the watch sets or otherwise changes the time. For example, the controlling device can be caused to vibrate to indicate that the time has been transmitted and/or been changed on the watch. As another example embodiment, the watch can include a vibrator mechanism to notify the performer wearing the watch that the time on the watch has been changed per the commands as provided by the controlling device. Thus, in various embodiments, the invention is also directed to a software application.

The Illusion App, in one aspect, is embodied as computer-readable instructions stored on any compatible non-transitory computer-readable medium. The term "instructions" as used with respect to this invention generally indicates a set of operations to be performed on a computer or computing hardware within the controlling device, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a server, etc. In some aspects, the instructions can be downloaded or otherwise loaded onto the relative controlling device (e.g., mobile smart phone). For example, the instructions can be stored on an internet accessible server (such as an app store), from which they can be downloaded onto or otherwise loaded onto the controlling device. The instructions are executable, such that once loaded onto the controlling device, the Illusion App can be opened and operated to cause the controlling device to perform the operations described herein.

The Illusion App is designed to allow a user to enter various inputs into the controlling device 502, which transmits the control signal wirelessly to the illusion device 102 (i.e., watch) to cause the illusion device 102 to rotate the hour and/or minute hands (or other components) to the designated location. For example, this allows for a magician to control the hands on the watch using various input methods that the Illusion App allows.

Using both the Illusion App (when loaded onto a controlling device and illusion device 102, the magician can quickly and secretly set the watch to a spectator's named time within a few seconds (e.g., 2-3 seconds) with various input methods that the Illusion App offers, giving the illusion that the watch was set to that time before the start of the trick.

For example, in use, the magician takes off his watch (i.e., the illusion device 102) and starts to turn the crown showing that the hands are moving and asks the spectator to think of a time. The magician stops turning the crown, puts it face down in the spectator's hand and then asks the spectator to then name out loud the time they were thinking of. An assistant or anyone using a controlling device with the Illusion App can then input the named time, which transmits the time command to the illusion device 102, thereby causing the illusion device 102 to rotate the hands to the input time. The spectator can then turn over the watch (illusion device 102) and the time shown by the hands matches perfectly to their named time. As can be appreciated by those skilled in the art, there are a variety of techniques and operations that can be implemented with the Illusion App.

Figure 6:
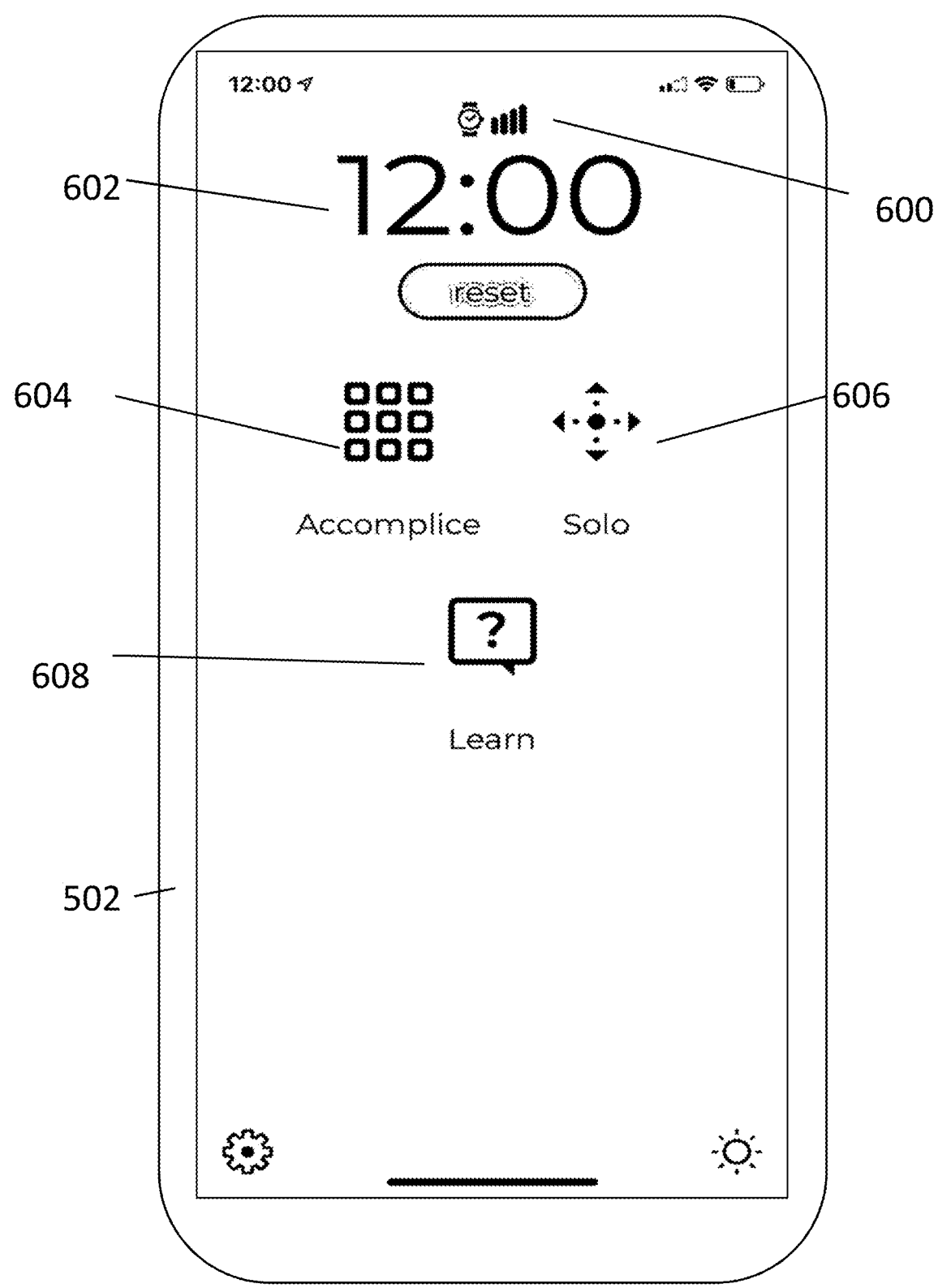
FIG. 6 is an illustration of a screen shot of a corresponding timepiece illusion device software application or "Illusion App", showing the Illusion App home screen along with application operations according to various embodiments of the present invention.

FIG. 6, for example, is an illustration of the Illusion App home screen along with application operations. In this example, the Illusion App indicates that the controlling device 502 is synced 600 with the timepiece illusion device and the amount of connectivity between the two (e.g., shown as bars for signal strength). Also displayed is the time 602 as shown on the timepiece illusion device and some modes that can be entered, including accomplice 604 and solo 606 modes. One would use the accomplice mode 604 when working with an accomplice, or the solo mode 606 when performing solo or alone. Finally, a click area for a learning tutorial 608 is also depicted.

Figure 7:
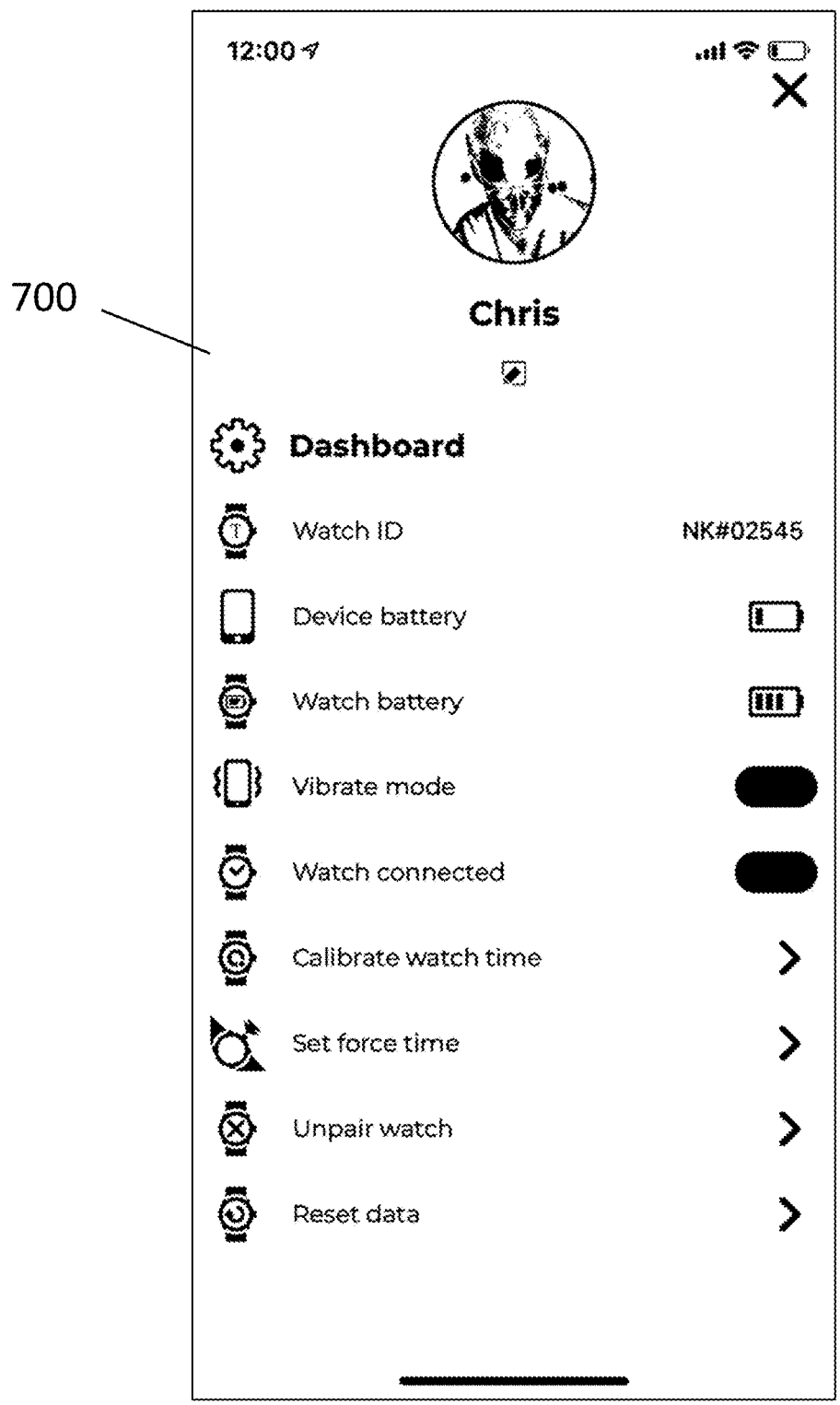
FIG. 7 is an illustration of a screen shot of a corresponding timepiece illusion device software application or "Illusion App", showing the Illusion App dashboard screen along with application operations and settings according to various embodiments of the present invention.
Figure 8:
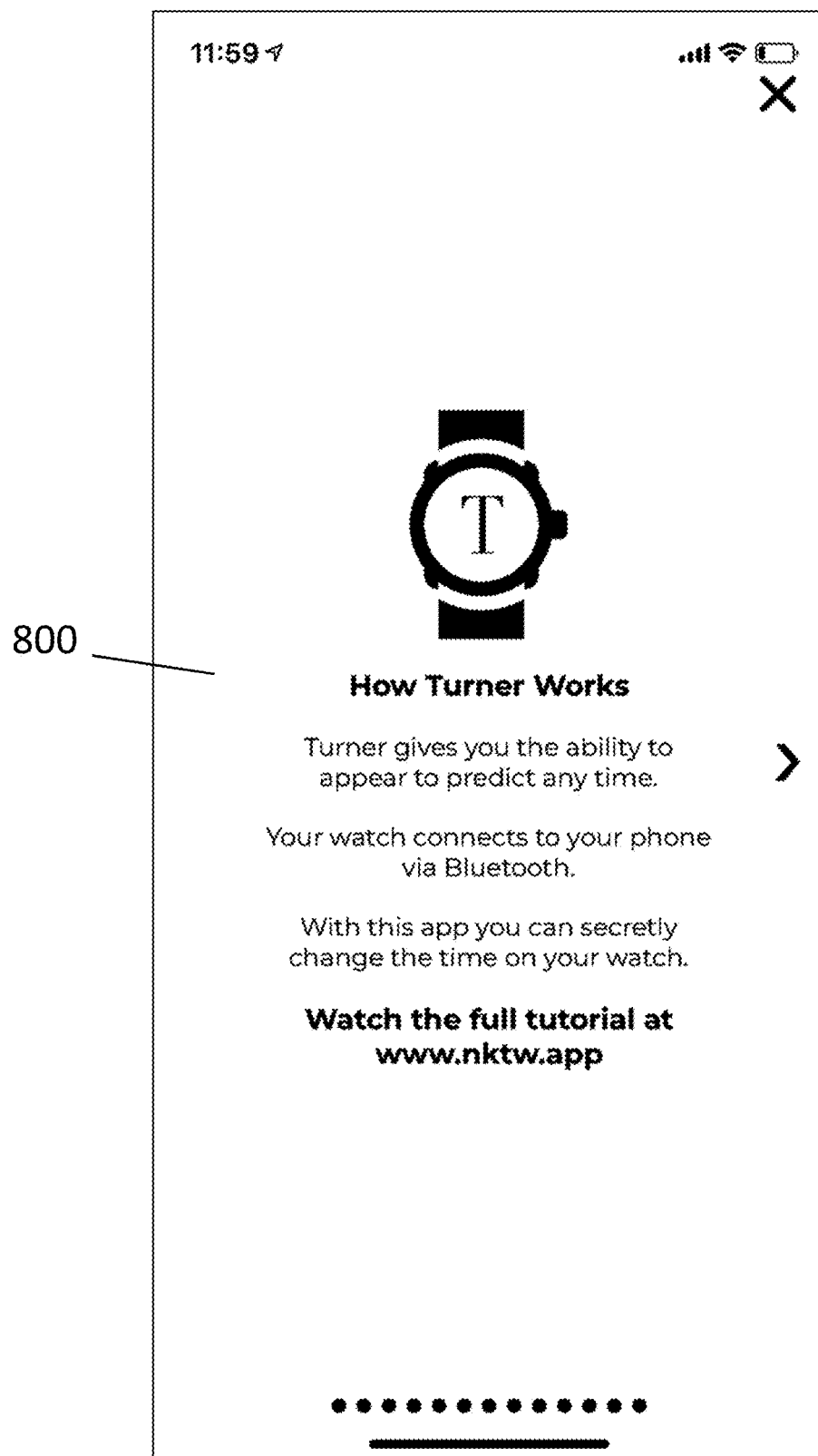
FIG. 8 is an illustration of a screen shot of a corresponding timepiece illusion device software application or "Illusion App", showing the Illusion App description and setup according to various embodiments of the present invention.
Figure 9:
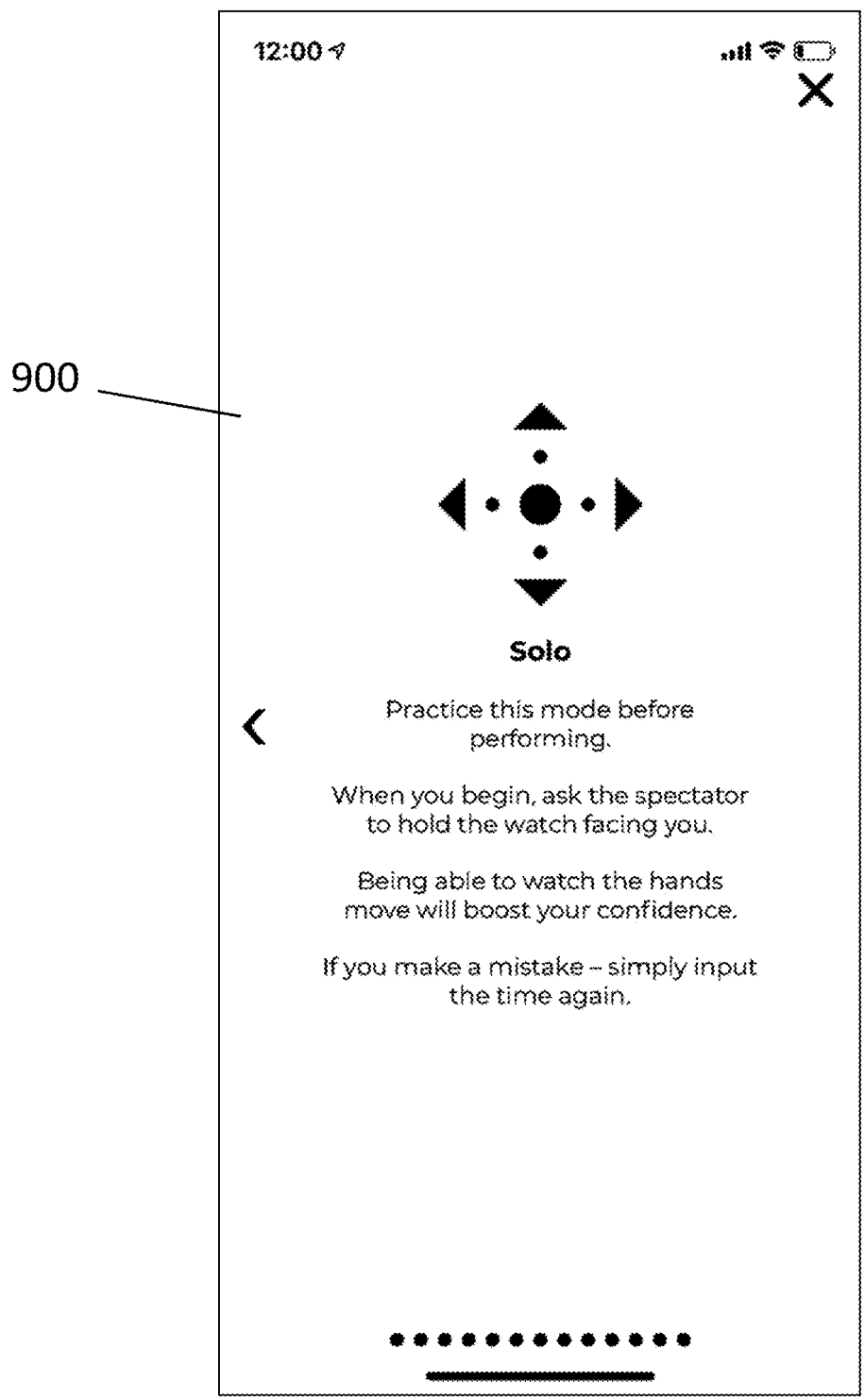
FIG. 9 is an illustration of a screen shot of a corresponding timepiece illusion device software application or "Illusion App", showing the Illusion App practice mode according to various embodiments of the present invention.
Figure 10:
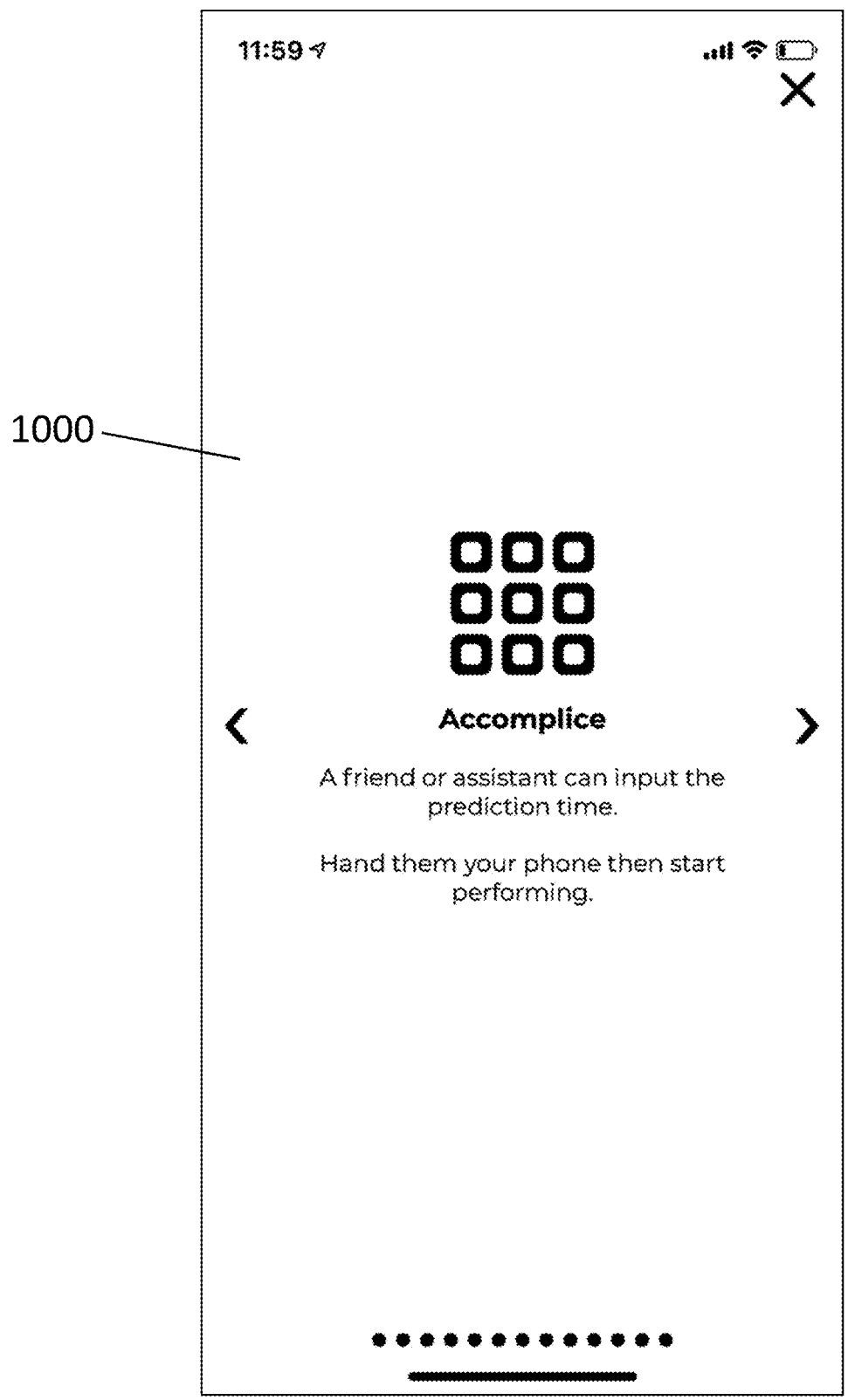
FIG. 10 is an illustration of a screen shot of a corresponding timepiece illusion device software application or "Illusion App", showing the Illusion App accomplice mode, which allows a spectator or assistant to input the suggested time according to various embodiments of the present invention.

FIG. 7 is a screen shot of the Illusion App dashboard screen 700, along with application operations and various settings. FIG. 8 is a screen shot of the Illusion App description and setup page 800, while FIG. 9 depicts a solo mode practice screen 900 and FIG. 10 depicts an accomplice screen 1000.

Figure 11:
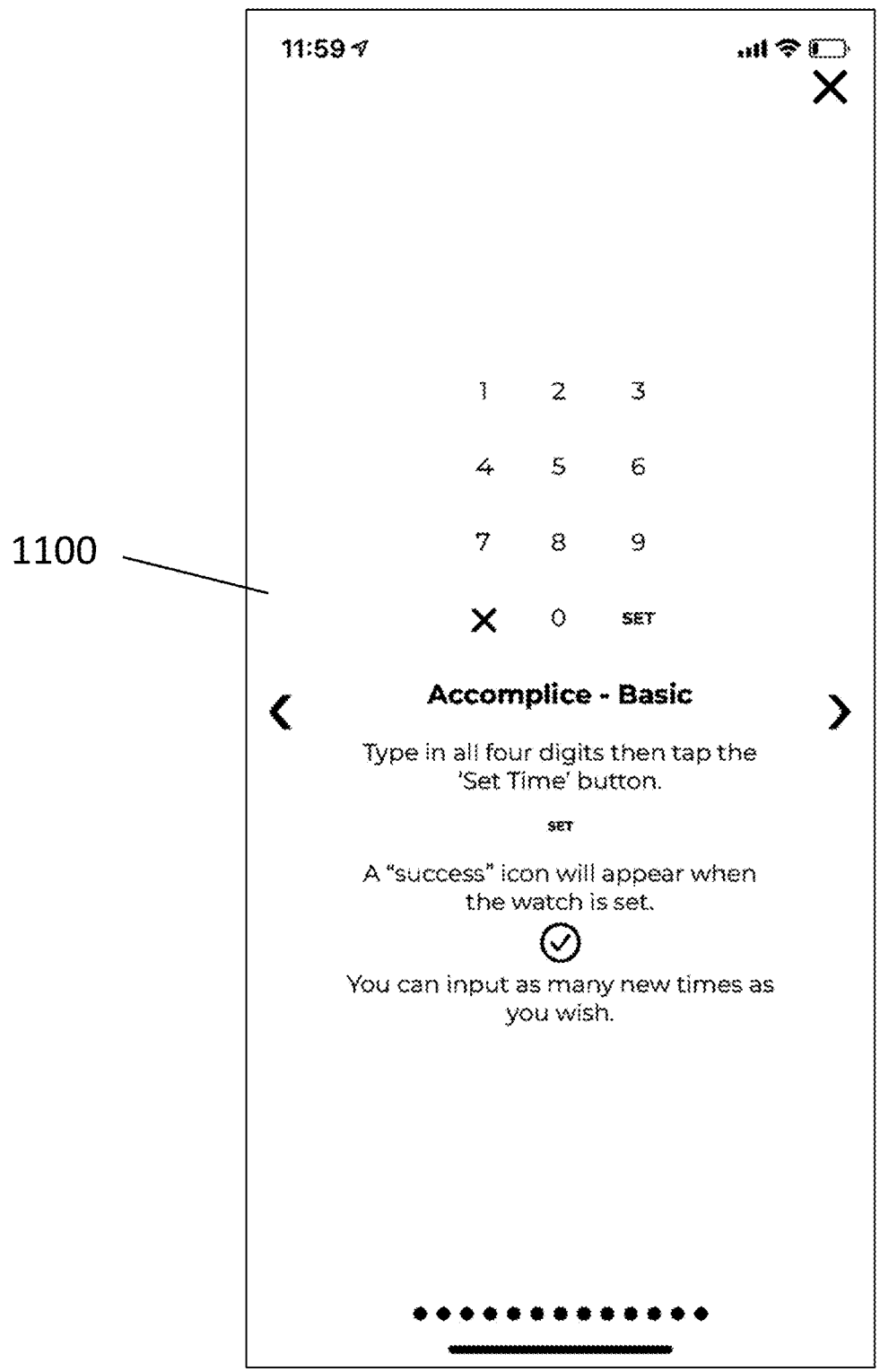
FIG. 11 is an illustration of a screen shot of a corresponding timepiece illusion device software application or "Illusion App", showing the Illusion App's basic mode to set the desired time by entering the numbers on the application key pad according to various embodiments of the present invention.

FIG. 11 is a screen shot of the accomplice screen key pad 1100, showing how an accomplice can set the desired time by entering the numbers on the application key pad to transmit the time to the timepiece illusion device.

Figure 12:
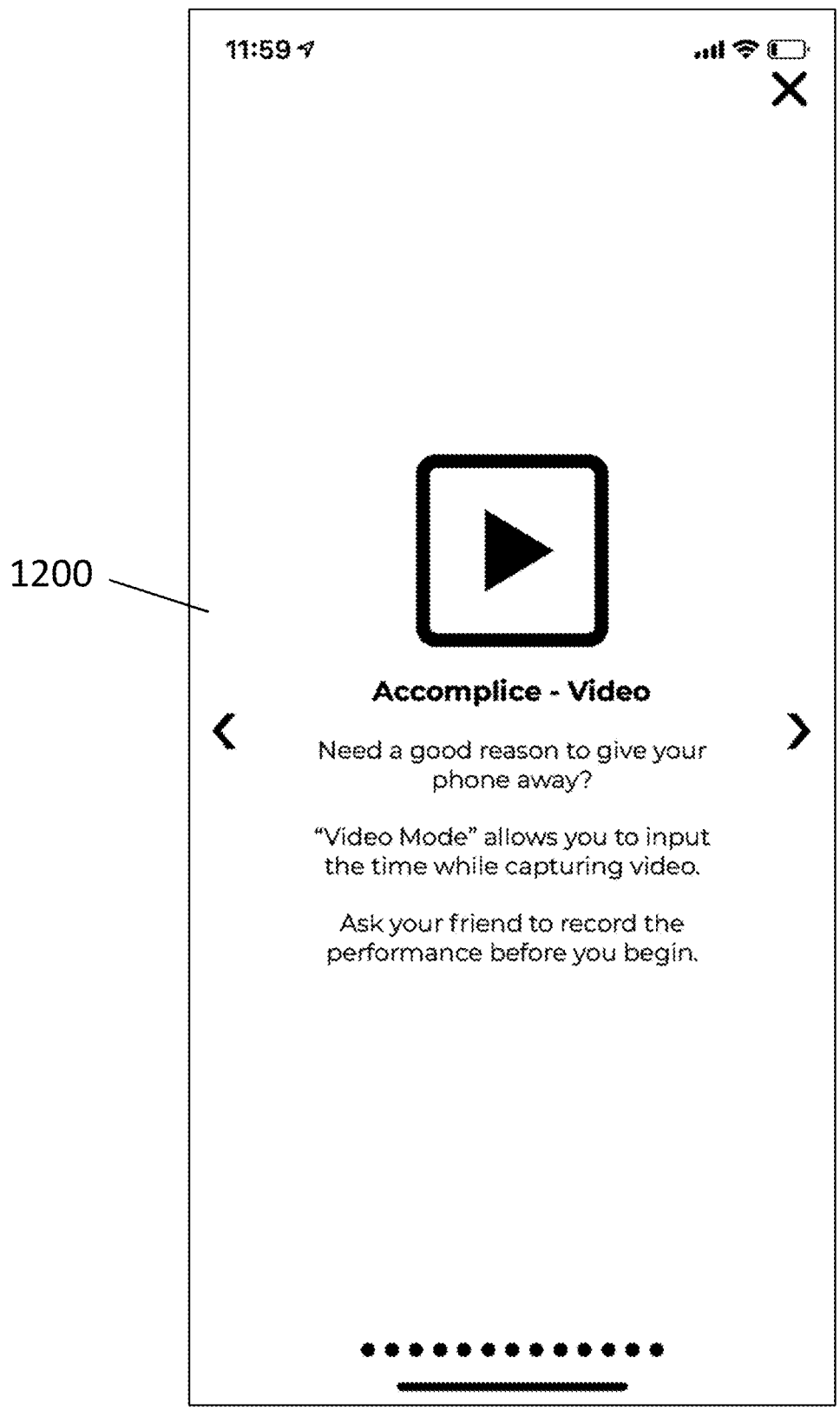
FIG. 12 is an illustration of a screen shot of a corresponding timepiece illusion device software application or "Illusion App", showing the Illusion App's video mode to set the desired time by swiping on the video recording page in the designated directions for the appropriate time according to various embodiments of the present invention.

FIG. 12 is a screen shot showing the Illusion App's video swipe mode page 1200. In this aspect, a user can set the desired time by swiping on the video recording page in the designated directions for the appropriate time while recording a video. The swipes would not likely be noticed by an audience but would be received by the controlling device which would transmit the commands to the timepiece illusion device. In this aspect, the swipes can be, for example, the same swiping motions as one might use in the solo mode (described in further detail below); however, the swipes would be input on the video recording screen while the controlling device is recording a video.

Figure 13:
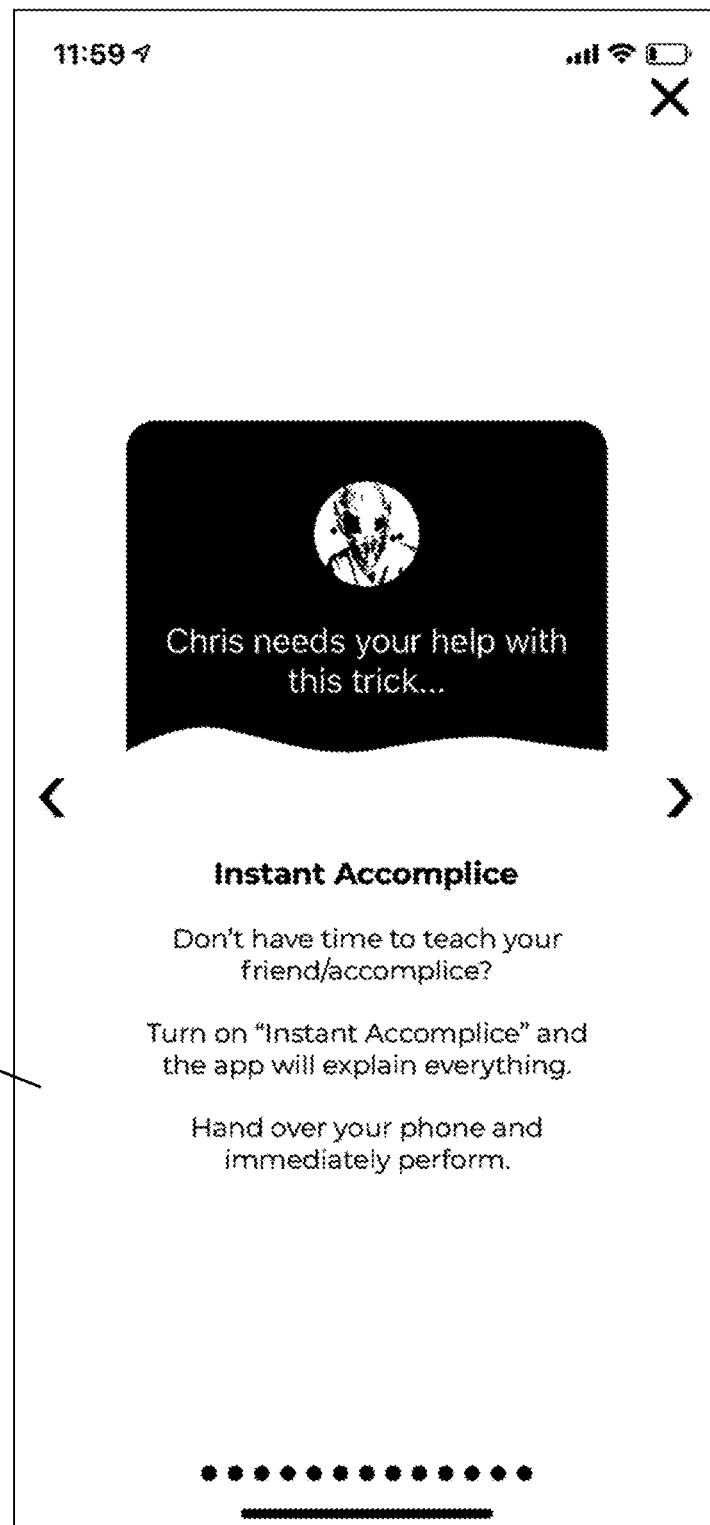
FIG. 13 is an illustration of a screen shot of a corresponding timepiece illusion device software application or "Illusion App", showing the Illusion App's instant accomplice, which shows a tutorial to allow an assistant or spectator to learn the application mechanics without having to demonstrate the process according to various embodiments of the present invention.

FIG. 13 is a screen shot of an instant accomplice page 1300, which when activated shows a tutorial to allow an assistant or spectator to learn the application mechanics without requiring the performer to personally demonstrate the process.

Thus and as can be appreciated by those skilled in the art, the time as displayed by the hands on the watch (illusion device 102) can be changed via a variety of Illusion App based input methods including, but not limited to, voice recognition, false passcode screen, false calculator, false web search, false time-zone website, false video record screen, false notes, false message app within the linking. There are also input methods possible without the mobile app, including, but not limited to, an accomplice/confederate webpage, remote control and a button/accelerometer trigger inside the watch itself. For further understanding, the Illusion App is configured to cause the controlling device (e.g., smart phone) to operate through any of the input methods described herein to allow the magician to secretly control the hands of the watch.

Figure 14:
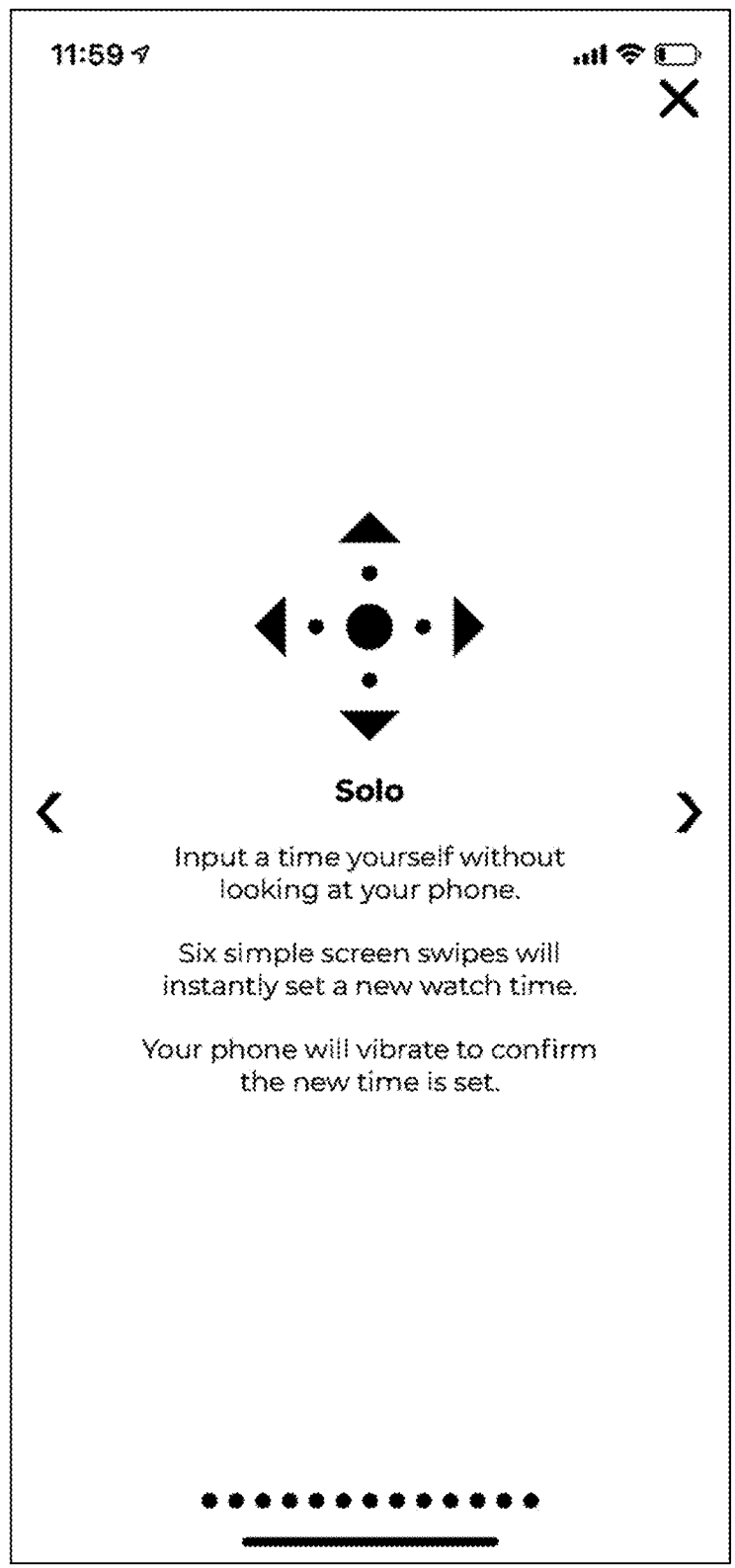
FIG. 14 is an illustration of a screen shot of a corresponding timepiece illusion device software application or "Illusion App", showing the Illusion App's solo feature, which allows the performer to input the desired time without looking at the screen according to various embodiments of the present invention.
Figure 15:
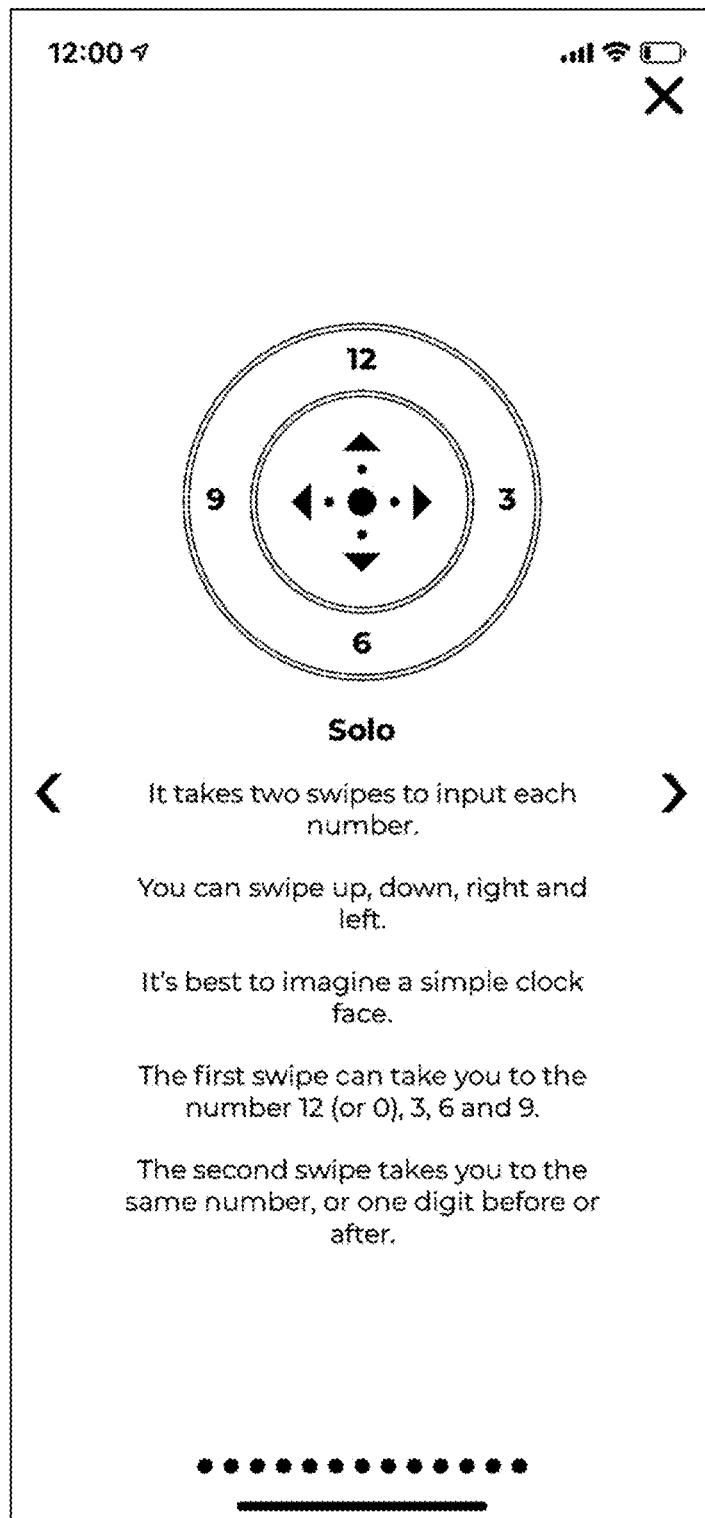
FIG. 15 is an illustration of a screen shot of a corresponding timepiece illusion device software application or "Illusion App", showing the Illusion App's solo feature description, which demonstrates the swiping mechanics to input the desired time according various embodiments of the present invention.
Figure 16:
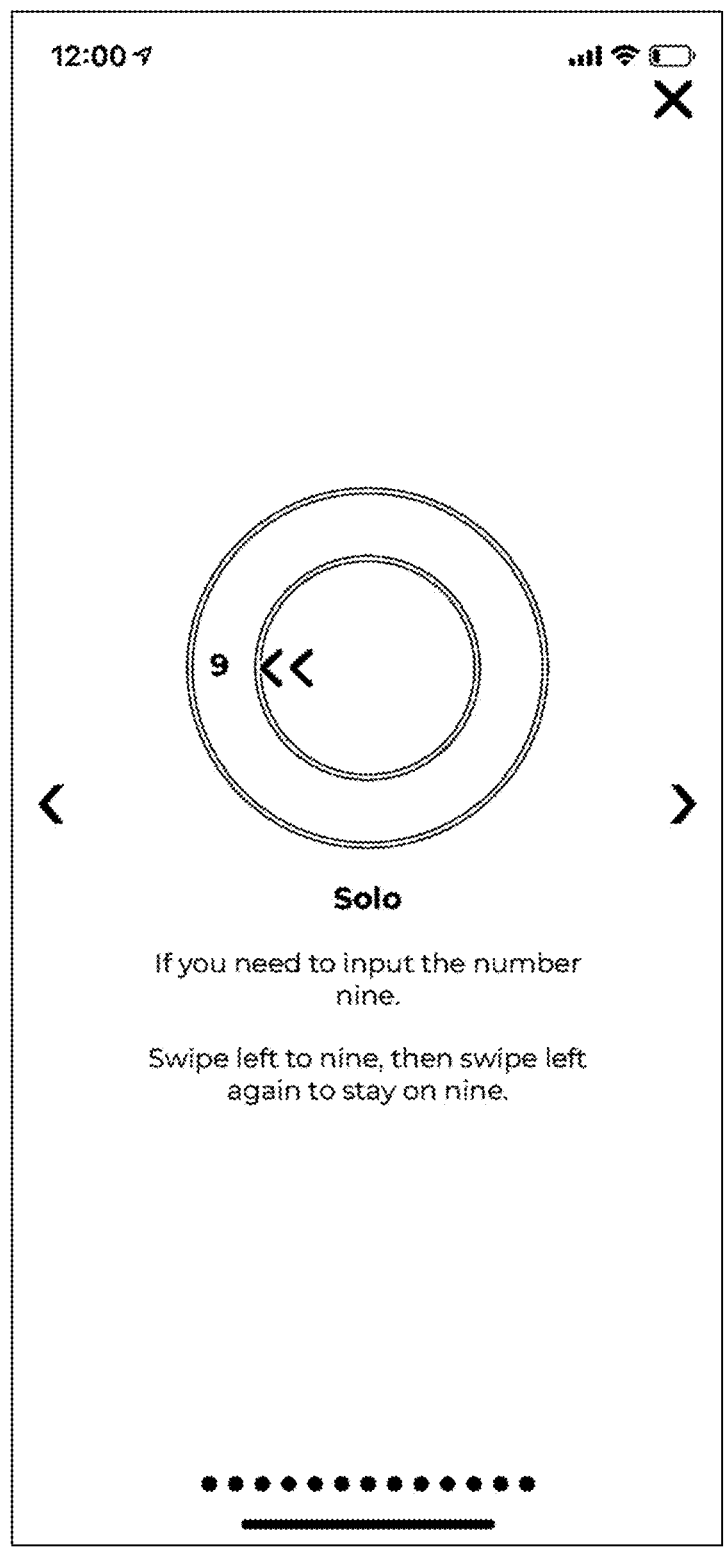
FIG. 16 is an illustration of a screen shot of a corresponding timepiece illusion device software application or "Illusion App", showing an example process of inputting the specific number 9 into the solo application mode according various embodiments of the present invention.
Figure 17:
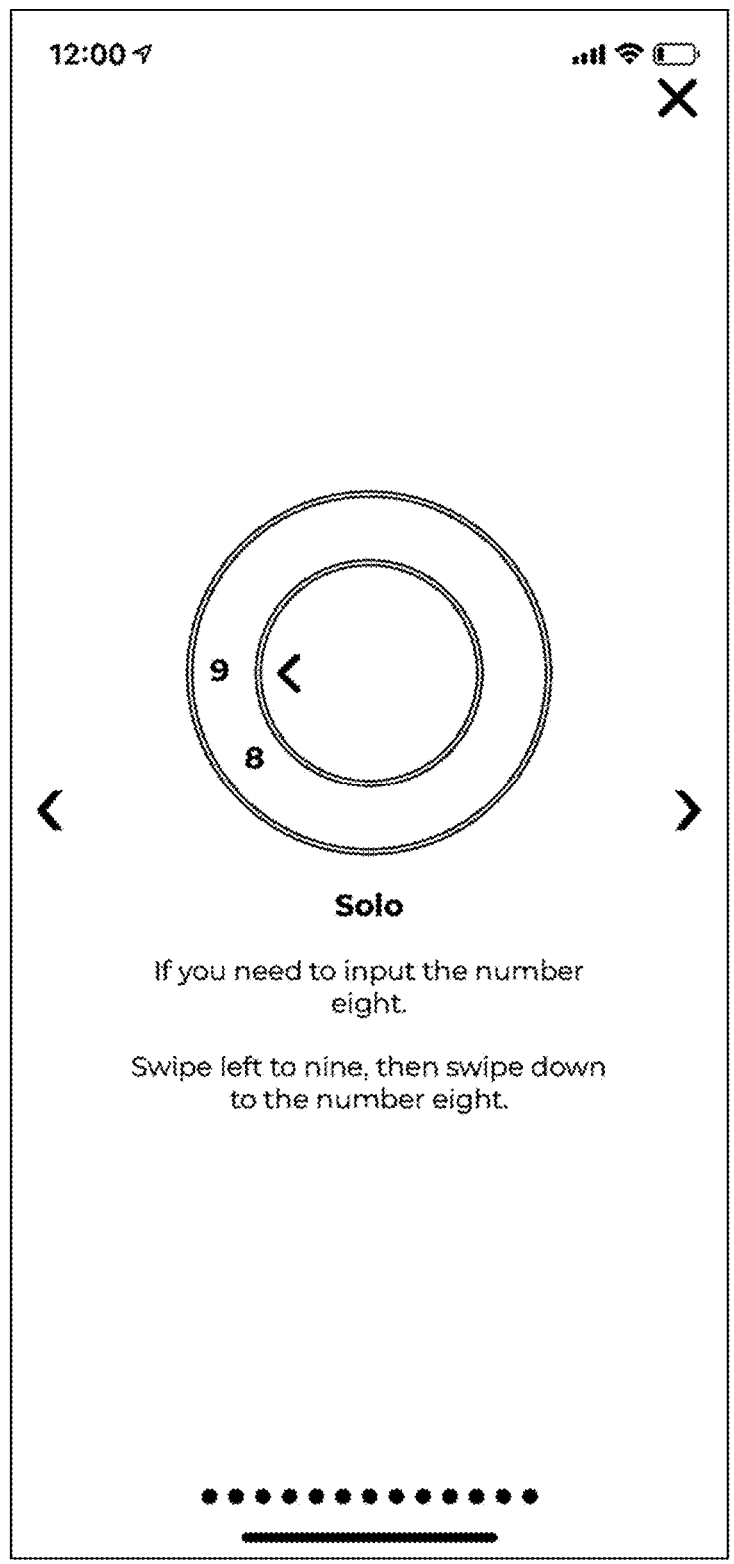
FIG. 17 is an illustration of a screen shot of a corresponding timepiece illusion device software application or "Illusion App", showing an example process of inputting the specific number 8 into the solo application mode according various embodiments of the present invention.
Figure 18:
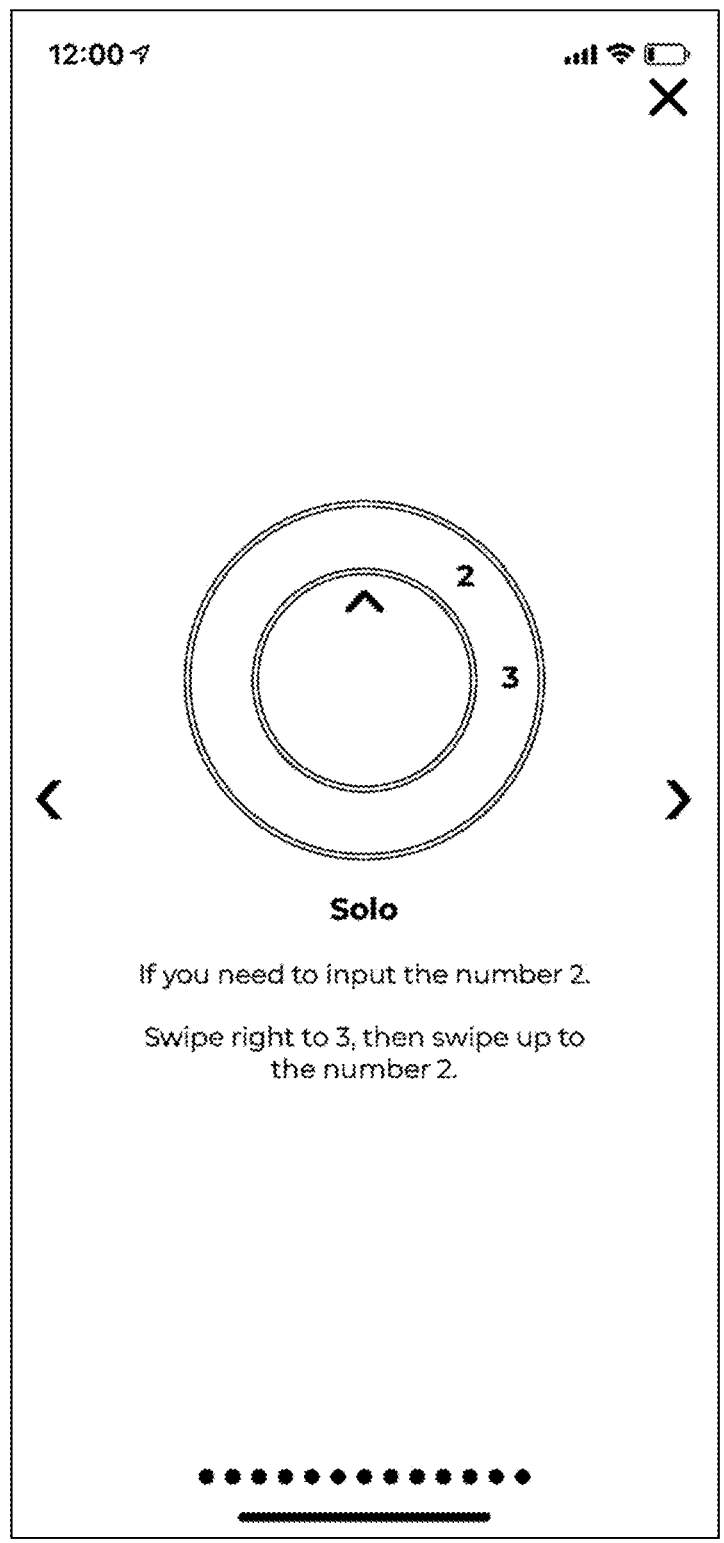
FIG. 18 is an illustration of a screen shot of a corresponding timepiece illusion device software application or "Illusion App", showing an example process of inputting the specific number 2 into the solo application mode according various embodiments of the present invention.
Figure 19:
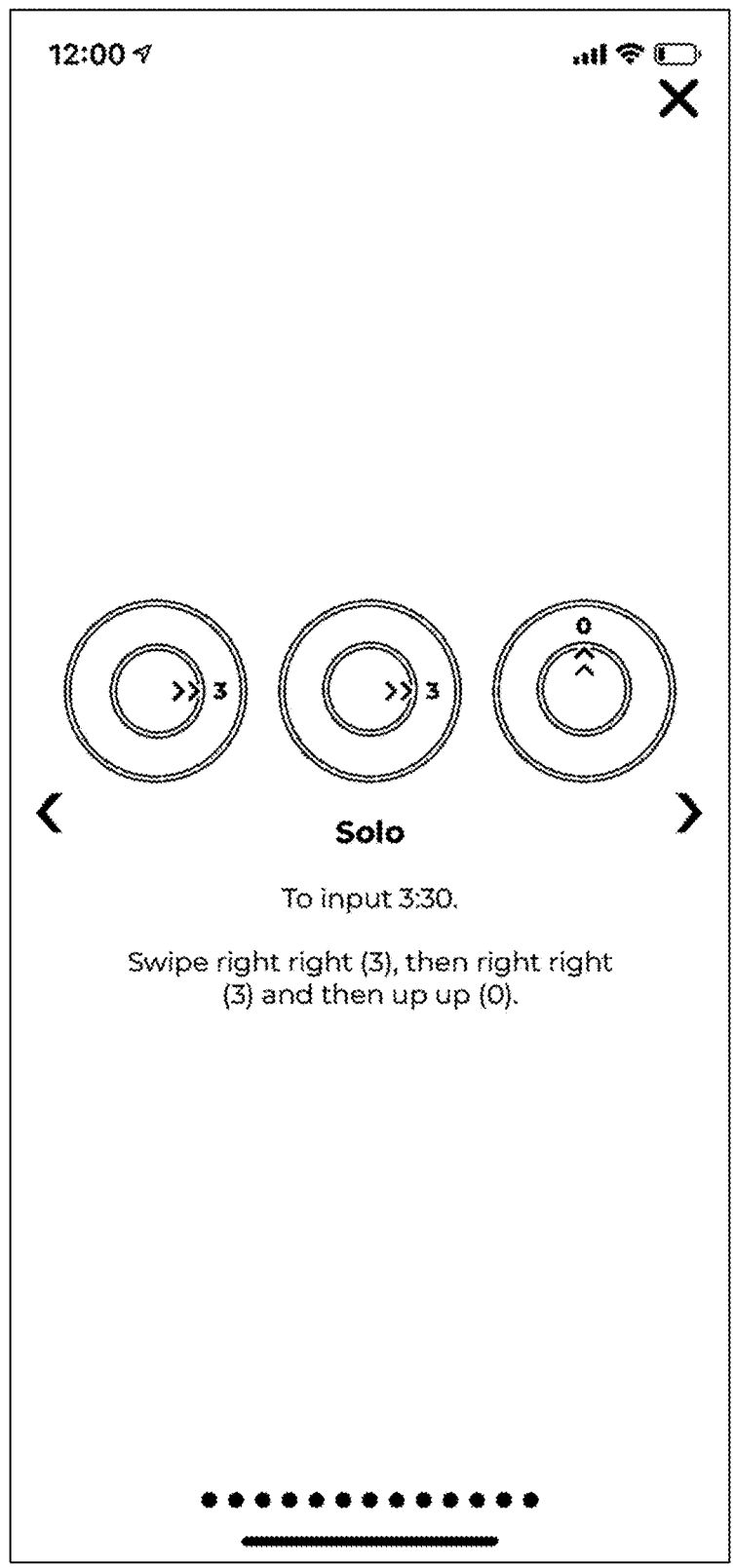
FIG. 19 is an illustration of a screen shot of a corresponding timepiece illusion device software application or "Illusion App", showing an example process of inputting the specific time 3:30 into the solo application mode according various embodiments of the present invention.
Figure 20:
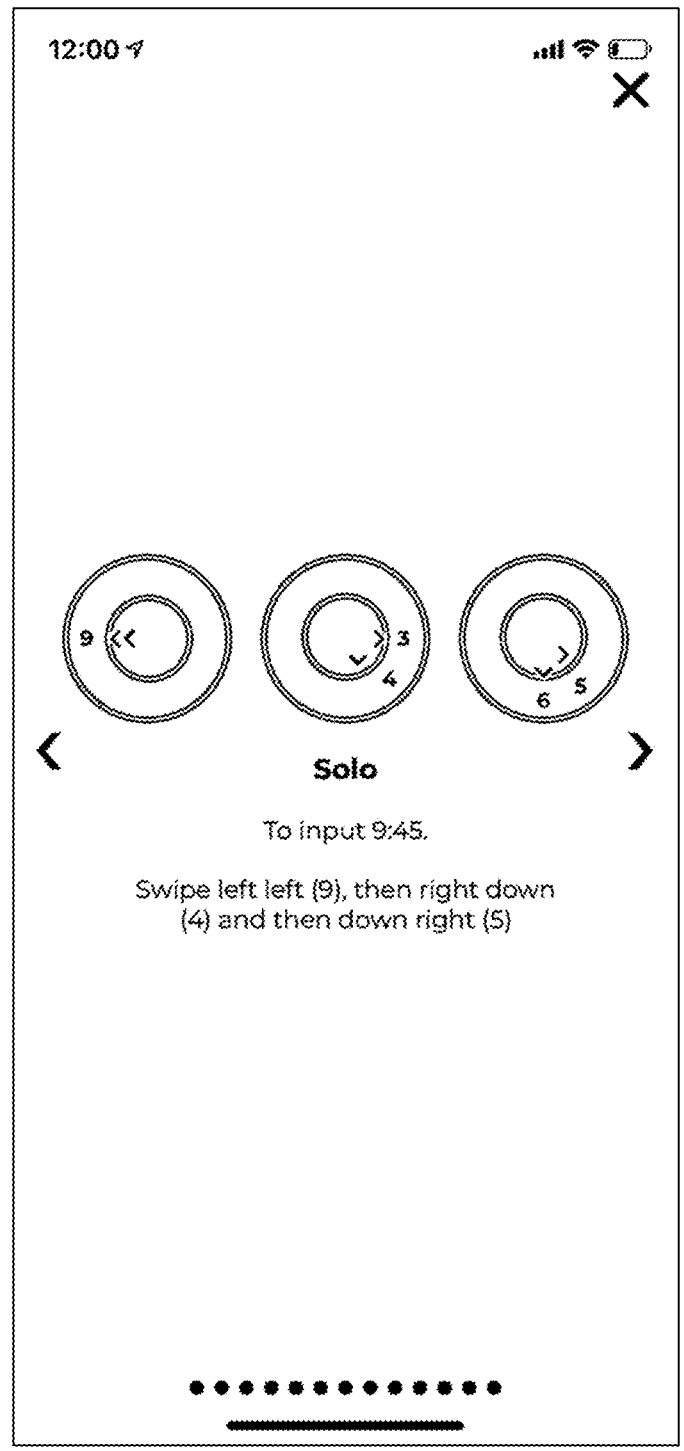
FIG. 20 is an illustration of a screen shot of a corresponding timepiece illusion device software application or "Illusion App", showing an example process of inputting the specific time 9:45 into the solo application mode according various embodiments of the present invention.

For example and as referenced above, the Illusion App provides for a solo mode. In the solo mode and as shown in FIG. 14, the performer can control the timepiece illusion device by secretly operating the controlling device without looking at the actual controlling device. In this aspect, the performer operates the controlling device by inputting the desired time with a swiping motion on the control touch screen of the controlling device. For example, the performer may have her smart phone in a pocket while performing and can swipe across the touch screen to secretly input a command into the controlling device which transmits the time command to the timepiece illusion device. For example, the swiping mechanics are that of swiping in the direction of the main clock hours, i.e. 12, 3, 6, and 9, then followed by the direction of the secondary number that is desired, which is shown in FIG. 15. FIG. 16 shows a non-limiting example of inputting the number 9 which would be a swipe to the left. Furthermore, in FIG. 17, the desired time in the non-limiting example is 8, meaning the performer would swipe left to the 9 and then swipe down to represent the number 8. Another non-limiting example, shown in FIG. 18, is demonstrating the desired time being 2, meaning the performer would need to swipe right to the 3 and then swipe up to the number 2. This being said, if the desired time is a 12, 3, 6, or 9, the input number of swipes should still be two, as shown in FIG. 19, the desired time is 3:30, meaning the performer would need to swipe right twice to represent the 3 o'clock hour, then swipe right twice again to represent the 3 in the minutes, finally swiping up twice to represent the 0 in the desired time. Another non-limiting example shown in FIG. 20, is that of the desired time being 9:45, meaning the performer would swipe left twice to represent and lock in the 9, swipe right, then down to represent the 5, and then swipe down and right to represent the 5. Thus, in this example, the input command on the controlling device would be 9:45, which would then be transmitted to the timepiece illusion device to cause the timepiece illusion device to rotate the hour and minute hands to reflect 9:45. As can be appreciated, other command operations also can be implemented.

The Illusion App can be programmed and configured to use the voice recognition that is in nearly every smart phone (e.g., apple and android phone) to set the time on the watch. For example, when the participant states their selected time, the performer repeats the time which is recognized by the performer's smart phone. In this aspect, the Illusion App can cause the phone to vibrate in the performer's pocket once the time has been set on the corresponding timepiece illusion device.

Another example is provided by a passcode screen. For example, the Illusion App offers a passcode screen that resembles the passcode screen on smart phone devices (e.g., IOS and Android devices, etc.). This allows the magician to create a reason to go into his phone which would presumably require that he unlock a screen. However, the passcode screen as displayed in this aspect is fake and, instead, is an input screen for the magician. While the magician pretends to put in the passcode, code he can simply put in the named time which will close the Illusion App passcode screen, imitating the phone being unlocked. In this aspect, the input time would then be transmitted to the timepiece illusion device to cause the hands on the timepiece illusion device to rotate to the designated time. There is also an option to have the spectator input the code. Say the spectator names 7:35, the pass code can be a predetermined digit off of the time. As a non-limiting example, the pass code can be 1 digit more than the time named, so the code in the 7:35 example will be 1846 (i.e., 0+1, 7+1, 3+1, 5+1). As another example, if the time was 9:27, the pass code could be 1038. Thus, once that pass code is input, the fake passcode screen disappears, and the input time would then be transmitted to the timepiece illusion device.

As another example, the Illusion App can provide for a forced time to allow the performer to pick a force time in the app. Let's say it is 5:30. Now the spectator can turn the crown on the watch while it is faced down and stop whenever they like. When the crown is pushed in it activates a button and the watch goes to the forced time (5:30) but seems to be a completely free and fair choice done by the spectator. The magician can now take a spectator's watch and set the time secretly to 5:30 at the same time. When the watches are turned over, they are impossibly matching.

As noted above, the Illusion App can also provide for a fake video screen. In this aspect, the performer or magician can hand his/her phone to a friend or spectator to have them record a video of the performer while performing the effect. On this video screen there will be quick directions on what to do, informing the friend how to assist in the illusion, along with a small keypad in which they can input the desired time to send to the watch. Alternatively, instead of the keypad, the fake video screen can receive the input swiping commands as described above.

In other aspect, the timepiece illusion device can also be connected to a remote control directly or through to the app. For example, a common push button remote can be provided with time command buttons that can be used to remotely control the timepiece illusion device. As a non-limiting example, the remote can be formed to look like a common pen; however, in this aspect, the remote includes hidden buttons allowing the magician to have the remote in full view at all times. In some aspects, the pen uses of a magnetic system between itself and the pad which transmits what is written, allowing the watch to automatically change to the correct time as written by the spectator.

In other aspects, various fake websites can be set up so when a time is entered, the controlling device (e.g., smart phone) will send the information to the timepiece illusion device. These are accessible webpages that the spectators can view and interact with via their personal devices.

Through a series of swipes or taps on the phone screen, the magician or performer can covertly arrive at or input the desired time. As a non-limiting example, in a performance, assume the subject or participant says the time of 3:21. The performer will swipe right 3 times for the hour, and then swipe up twice to get the two and then down once for the 1. The hour taps will be on the right side of the screen, the first minute digit on the top and the second minute digit on the bottom. It should be noted that the specific example provided above is not intended to be limiting in that all orientations and combinations of swipes and taps can be changed as desired or designed into the App.

In other aspects, the Illusion App can be programmed to cause the controlling device (e.g., smart phone) to vibrate values and be stopped at a certain point via the volume keys on the phone arriving at the desired time. As a non-limiting example, the phone will vibrate from 1-12 times and the performer will need to either tap the screen through their pocket or push the volume button to lock in the hour once it vibrates the correct amount of times. This process can then be repeated for both digits of the minutes. After receiving the input, the controlling device transmits the time to the timepiece illusion device, which causes the timepiece illusion device to turn the hands to the designated time.

In yet another aspect, the Illusion App can also be programmed to generate a fake calculator screen. In this aspect, the fake calculator screen when displayed on the controlling device allows the performer to input amounts into the calculator, which are then transmitted to the timepiece illusion device as designated times to turn the hour and minute hands to. The amount put into the calculator screen can also be a predetermined digit off of the time. As a non-limiting example, the pass code can be 1 digit more than the time named. So if the named time is 7:35, the calculator can be used to add 18 and 46 (i.e., 0+1, 7+1, 3+1, and 5+1).

The timepiece illusion device (i.e., watch) can also be formed to include a variety of additional secondary features. For example, the watch can be equipped with a vibrate function (via a vibrator mechanism) that can be used in various ways. A hidden LED display can also be under the face of the watch. This allows secret information to be given to the person (i.e., performer or magician) wearing this watch. An assistant can input information through the Illusion App onto a controlling device (e.g., smart phone) and the watch will vibrate notifying that information will be coming shortly. The LED will shine through the face of the watch momentarily giving the performer the necessary information and then shut off. In this aspect, when the LED is off, the watch face appears like a traditional analog watch face with hour and minute hands. However, when the LED is on, the light of the LED is able to shine through the watch face and can be seen by the performer to secretly transmit messages from the assistant to the performer wearing the watch. Such messages can include times, dates, names, or any other message that may be desired given the specific performance.

In summary, this disclosure is directed to a timepiece illusion device formed to appears as an ordinary analog watch or timepiece with hour and minute hands. This disclosure is also directed to a software application (Illusion App) that can be loaded onto a smartphone or other device. The Illusion App allows a user to provide inputs into the smartphone, which are transmitted (e.g., as time commands, etc.) from the smartphone to the timepiece illusion device. The timepiece illusion device then moves the hour and minute hands per the time command or otherwise performs the relevant operation per the input from the smartphone. The Illusion App includes all of the relevant instructions that can be loaded onto a smartphone or device to perform the operations described herein. Further, the timepiece illusion device includes all of the necessary hardware and components as may be needed to perform the various operations described herein.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A timepiece illusion system, comprising:
   a timepiece illusion device, the timepiece illusion device including:
      a watch face with hour and minute hands, the hour and minute hands being separately rotatable about the watch face; and
      a mechanism configured to connect wirelessly to and be controlled by a separate external controlling device with a wireless time command to cause the hour and minute hands to rotate about the watch face to reflect the wireless time command;
   a controlling device, the controlling device having executable instructions stored on a non-transitory computer readable medium, such that upon execution of the instructions, the controlling device is caused to perform operations of:
      receiving a time command; and
      wirelessly transmitting the time command to the timepiece illusion device; and
      wherein in receiving the time command, the controlling device depicts a false passcode screen, such that inputs into the false passcode screen are converted into the time command.

2. The timepiece illusion system as set forth in claim 1, wherein the wireless time command is received using a technology selected from a group consisting of Bluetooth, radio frequency, and radio frequency identification (RFID).

3. The timepiece illusion system as set forth in claim 1, wherein the timepiece illusion device further comprises a vibrator mechanism, such that when the hour and minute hands are set to reflect the wireless time command, the vibrator mechanism vibrates, thereby indicating that the hour and minute hands have been set to reflect the wireless time command.

4. The timepiece illusion system as set forth in claim 1, wherein in receiving the time command, the controlling device is configured to be set in at least one of a variety of modes, including a swipe mode, a voice recognition mode, a false passcode screen mode, and a false calculator screen mode;
   wherein in the swipe mode, the controlling device receives swipe commands on a touch screen, the swipe commands being directional swipes on the touch screen to indicate an hour and minute command;
   wherein in the voice recognition mode, the controlling device uses voice recognition to receive a stated time by a performer;
   wherein in the false passcode screen mode, the controlling device depicts a false passcode screen, such that inputs into the false passcode screen are converted into the time command; and
   wherein in the false calculator screen mode, the controlling device depicts a false calculator screen, such that inputs into the false calculator screen are converted into the time command.

5. The timepiece illusion system as set forth in claim 1, wherein in receiving the time command, the controlling device receives swipe commands on a touch screen, the swipe commands being directional swipes on the touch screen to indicate an hour and minute command.

6. The timepiece illusion system as set forth in claim 1, wherein in receiving the time command, the controlling device uses voice recognition to receive a stated time by a performer.

7. The timepiece illusion system as set forth in claim 1, wherein in receiving the time command, the controlling device depicts a false calculator screen, such that inputs into the false calculator screen are converted into the time command.

8. A timepiece illusion system, comprising:
   a timepiece illusion device, the timepiece illusion device including:
      a watch face with hour and minute hands, the hour and minute hands being separately rotatable about the watch face; and
      a mechanism configured to connect wirelessly to and be controlled by a separate external controlling device with a wireless time command to cause the hour and minute hands to rotate about the watch face to reflect the wireless time command;
   executable instructions stored on a non-transitory computer readable medium, the executable instructions being loadable onto a controlling device, such that upon loading onto the controlling device and upon execution of the instructions, the controlling device is caused to perform operations of:
      receiving a time command; and
      wirelessly transmitting the time command to the timepiece illusion device such that in receiving the time command, the controlling device is caused to depict a false passcode screen, such that inputs into the false passcode screen are converted into the time command.

9. The timepiece illusion system as set forth in claim 8, wherein in receiving the time command, the controlling device receives swipe commands on a touch screen, the swipe commands being directional swipes on the touch screen to indicate an hour and minute command.

10. The timepiece illusion system as set forth in claim 8, wherein in receiving the time command, the controlling device uses voice recognition to receive a stated time by a performer.

11. The timepiece illusion system as set forth in claim 8, wherein in receiving the time command, the controlling device depicts a false calculator screen, such that inputs into the false calculator screen are converted into the time command.

12. A computer program product for controlling a timepiece illusion device, the computer program product comprising:
   a non-transitory computer-readable medium having executable instructions encoded thereon, such that upon execution of the instructions by one or more processors, the one or more processors perform operations of:

receiving a time command;

wirelessly transmitting the time command to the timepiece illusion device having a watch face with hour and minute hands, the hour and minute hands being separately rotatable about the watch face, such that upon receiving the time command, the timepiece illusion device is caused to rotate the hour and minute hands about the watch face to reflect the wireless time command; and wherein in receiving the time command, the controlling device is caused to depict a false passcode screen, such that inputs into the false passcode screen are converted into the time command.

13. The computer program product as set forth in claim 12, wherein in receiving the time command, the controlling device receives swipe commands on a touch screen, the swipe commands being directional swipes on the touch screen to indicate an hour and minute command.

14. The computer program product as set forth in claim 12, wherein in receiving the time command, the controlling device uses voice recognition to receive a stated time by a performer.

15. A computer program product for controlling a timepiece illusion device, the computer program product comprising:

a non-transitory computer-readable medium having executable instructions encoded thereon, such that upon execution of the instructions by one or more processors, the one or more processors perform operations of:

receiving a time command;

wirelessly transmitting the time command to the timepiece illusion device having a watch face with hour and minute hands, the hour and minute hands being separately rotatable about the watch face, such that upon receiving the time command, the timepiece illusion device is caused to rotate the hour and minute hands about the watch face to reflect the wireless time command; and wherein in receiving the time command, the controlling device depicts a false calculator screen, such that inputs into the false calculator screen are converted into the time command.

* * * * *